June 8, 1926.
C. W. GODWIN
PIPE HOLDING BRACKET
Filed March 4, 1924
1,588,350
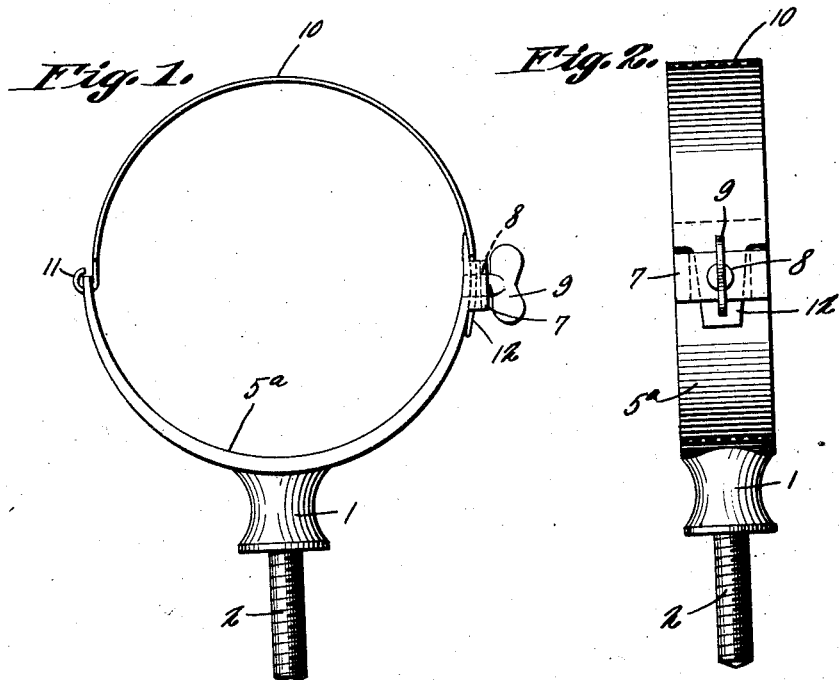
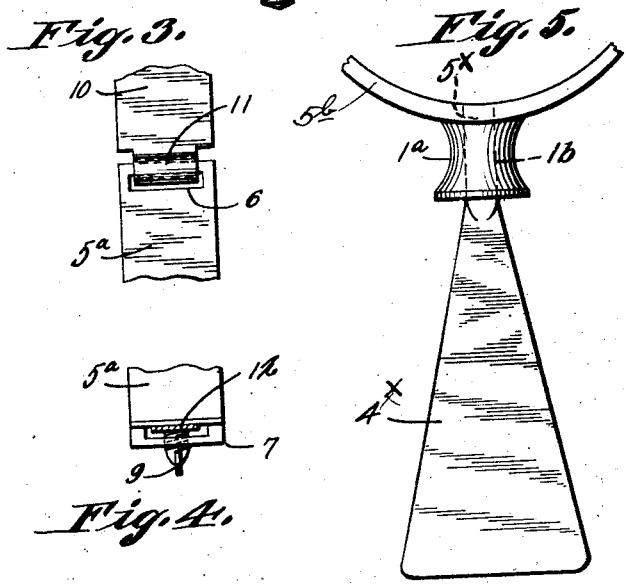
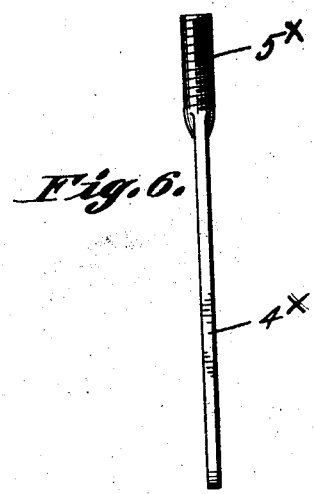
C. W. Godwin, INVENTOR
BY Victor J. Evans, ATTORNEY Patented June 8, 1926.

1,588,350

UNITED STATES PATENT OFFICE.

CHARLES W. GODWIN, OF ALLIANCE, OHIO.

PIPE-HOLDING BRACKET.

Application filed March 4, 1924. Serial No. 696,854.

The object of my said invention is the provision of a pipe holding bracket, of simple and inexpensive construction devised with a view to being made to tightly fit and hold pipes of various diameters.

To the attainment of the foregoing, the invention consists in the improvement as hereinafter described and definitely claimed.

In the accompanying drawings, forming part of this specification:—

Figure 1 is a side elevation of my novel bracket.

Figure 2 is an edge elevation of same.

Figure 3 is a detail of a hinge connection hereinafter explicitly referred to.

Figure 4 is a detail cross section of the bracket.

Figures 5 and 6 are detail views of a modification hereinafter explicitly referred to.

Similar numerals designate corresponding parts in Figures 1 to 4 to which reference will first be made.

Among other elements my novel bracket comprises a base 1 to which is fixed a preferably integral screw 2 for the convenient attachment of the base to a wooden building or other wooden support.

Appropriately fixed to or integral with the outer end of the base of the bracket is an inner curvilinear body section $5^a$. Near one end the body section $5^a$ is provided with a slot 6, Figure 3, and on its outer side adjacent to its opposite end the body section $5^a$ is provided with a loop 7, Figure 4, in the outer wall of which is a threaded aperture 8 to receive the threaded shank of a thumb screw 9. In addition to the inner section $5^a$ the body of my novel bracket comprises an outer curvilinear section 10. One end of this section 10 is reduced to form a tongue 11, and this tongue 11 is inserted through the slot or aperture 6 and is bent so as to hingedly connect the section 10 of itself to the section $5^a$ without the employment of any extraneous means, which manifestly contributes to the strength and durability of the device. At its end remote from the said hinge connection the section or member 10 is provided with a reduced terminal portion 12, Figures 2 and 4, designed to be sheathed in the loop 7 and to be engaged and held by the thumb screw 9. It will be readily apparent in this connection that the reduced terminal 12 on the member or section 10 is of considerable length, and from this it follows that the terminal end of the section 10 may be adjusted in the loop 7 and adjustably fixed with a view to snugly fitting the holder body to the particular pipe to be held.

The modification shown in Figures 5 and 6 is for use when the bracket is to be fixed in a brick or stone building. According to said modification the base $1^a$ of the body section $5^b$ is provided with a threaded bore $1^b$, and in said bore $1^b$ is socketed the threaded shank $5^x$ of an anchor plate $4^x$. Manifestly the base $1^a$ is designed to be set against a wall of brick or stone, and the plate $4^x$ is adapted to be keyed in said wall.

It will be appreciated from the foregoing that notwithstanding the adaptability of my novel holder to be tightly fixed about a pipe therein, the holder is simple and inexpensive in construction and at the same time is strong and durable and hence calculated to withstand the usage to which devices of corresponding character are ordinarily subjected.

It will also be appreciated that the shoulder or base 1 or $1^a$ spaces the pipe away from the building so as to obviate dirt or other matter accumulating between the building and pipe, and at the same time all parts of the pipe and building can be properly painted and by so doing the life of the pipe will be prolonged. My improvement also allows the air to circulate around the pipe and bracket so that paint will dry out as quickly as any paint on any other part of the building; also, if pipe becomes clogged or any part of same needs renewing or shifting to any angle, the owner of same can do so with this hanger without aid of a mechanic, eliminating that expense.

I have entered into a detailed description of the construction and relative arrangement of the parts embraced in the present and preferred embodiments of my invention in order to impart a full, clear and exact understanding of the said embodiments. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

In a pipe holding bracket, a curvilinear body section having a slot adjacent to one of its ends and extending at right angles to its length and also having on its outer side adjacent to its opposite end a keeper loop, said loop having a threaded aperture in its outer wall, a screw having a shank bearing in said aperture, and a second curvilinear section or member having a reduced tongue at one end inserted through said slot of the first-named section and curled to form a hinge barrel and having at its opposite end a reduced terminal adapted to be sheathed in the keeper loop and to be adjustably fixed therein and held by the said screw in flatwise relation against the outer side of the end portion of the first-named section.

In testimony whereof I affix my signature.

CHARLES W. GODWIN.